US012683405B1

(12) United States Patent
Datta et al.

(10) Patent No.: US 12,683,405 B1
(45) Date of Patent: Jul. 14, 2026

(54) PROACTIVE RELAY AND RELAY DRIVER FAILURE IDENTIFICATION MECHANISM AND MICROGRID INTERCONNECT DEVICE INCLUDING THE SAME

(71) Applicant: EATON INTELLIGENT POWER LIMITED, Dublin (IE)

(72) Inventors: Aalokkumar Dulalchandra Datta, Kolhapur (IN); Pratik Kumar Kar, Berhampur (IN); Amit Ravindra Chavan, Kolhapur (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 19/021,482

(22) Filed: Jan. 15, 2025

(51) Int. Cl.
| | |
|---|---|
| *H02J 3/388* | (2026.01) |
| *H02H 1/00* | (2006.01) |
| *H02H 3/10* | (2006.01) |
| *H02J 3/0012* | (2026.01) |
| *H02J 3/38* | (2006.01) |
| *H02J 101/24* | (2026.01) |

(52) U.S. Cl.
CPC ........... *H02J 3/388* (2020.01); *H02H 1/0007* (2013.01); *H02H 3/10* (2013.01); *H02J 3/0012* (2020.01); *H02J 3/381* (2013.01); *H02J 2101/24* (2026.01)

(58) Field of Classification Search
CPC ...................................................... H02J 3/388

USPC ........................................................... 307/82
See application file for complete search history.

(56) References Cited

U.S. PATENT DOCUMENTS

| | | | |
|---|---|---|---|
| 2021/0390484 A1* | 12/2021 | Pallam | G06Q 30/0283 |
| 2023/0120740 A1* | 4/2023 | Lewchuk | B60L 53/63 |
| | | | 320/109 |
| 2023/0163598 A1* | 5/2023 | Rodriguez | H02J 3/381 |
| | | | 307/18 |
| 2023/0198244 A1* | 6/2023 | Holveck | H01H 71/70 |

* cited by examiner

*Primary Examiner* — Joseph Chang
(74) *Attorney, Agent, or Firm* — Eckert Seamans Cherin & Mellott, LLC

(57) ABSTRACT

A microgrid interconnect device (MID) includes: a relay structured to be connected to a utility grid and distributed energy resources (DERs); a relay driver connected to the relay and structured to actuate the relay to connect or disconnect the DERs from the grid, the relay driver further structured to provide relay state information including a relay driver fault feedback signal; a relay and relay driver failure identification mechanism connected to the relay driver and structured to perform a fault test to determine that the relay driver fault feedback signal is accurate; and a control circuit connected to the relay driver and the failure identification mechanism, the control circuit structured to cause the relay driver to actuate the relay, receive the relay state information, cause the failure identification mechanism to perform the fault test and determine that the relay driver fault feedback signal is accurate based on fault test results.

20 Claims, 3 Drawing Sheets

Fault Injection Mode

Normal Operating Condition

PROACTIVE RELAY AND RELAY DRIVER FAILURE IDENTIFICATION MECHANISM AND MICROGRID INTERCONNECT DEVICE INCLUDING THE SAME

FIELD OF THE INVENTION

The disclosed concept relates generally to a power management device, and in particular, to a microgrid interconnect device including a proactive relay failure identification mechanism.

BACKGROUND OF THE INVENTION

Solar energy, or photovoltaic (PV) systems coupled with energy storage systems have increasingly become an alternative to diesel generators for back-up power for single-family residences, multi-family residences, or small commercial or industrial businesses. These PV inverters, and energy storage battery inverters (collectively referred to as distributed energy resources (DERs)) are each connected to an electrical main panel, which interfaces with the utility grid (hereinafter, also referred to as the grid) and draws power from this connection to power normal loads and to charge vehicles or batteries.

A microgrid is a localized group of the DERs and loads and operate independently from the grid during the islanded mode or conjunction with the grid in the grid-connected mode. Islanding is the ability to disconnect from the grid in the event of, e.g., without limitation, a power outage while retaining the ability to manage the DERs and the loads. A microgrid interconnect device (MID) is a device structured to facilitate the connection and disconnection (islanding) of the microgrid from the grid. It ensures that the microgrid can operate in both the grid-connected and islanded modes while maintaining the safety and reliability of the electrical system. The MID is typically connected at the point of common coupling, which serves as a boundary between the DERs and the grid. It includes a switching element such as a relay or switch, a control circuit, a communication circuit and a measurement circuit (e.g., without limitation, sensing circuit including a Rogowski coil and metering integrated chip (IC)). The relay is structured to make or break the connection between the grid and the DERs under specific conditions. For example, the relay is structured to make the connection when the grid is available and the grid's voltage and frequency are within acceptable parameters. That is, the relay makes the connection when the voltages, frequences, and phases of the grid and the DERs are synchronized. The relay may make or break the connection based on a user command or autonomously based on a command from the control circuit in accordance with predefined conditions or logic. For example, upon detection of a power loss, the MID disconnects the DERs from the grid and allows the DERs to supply power to the loads. Upon detection of the presence of grid power and synchronization of the voltages, frequencies and phases of the grid and the DERs, the MID reconnects the DERs and the grid and allows both the grid and the DERs to supply power to the loads. In some examples, the DERs supply to the grid any excessive power generated by them.

In general, the MIDs rely on a relay driver fault diagnostic mechanism based on a relay driver fault feedback loop to make critical decisions. As such, the relay driver fault feedback loop is crucial for ensuring that the microgrid operates safely and effectively, especially during transitions between grid-connected mode and islanded mode. It helps prevent scenarios where the microgrid might inadvertently feed power back into the grid during an outage, which could be dangerous to utility field engineers. As such, the failure of the relay and relay driver may result in dangerous, hazardous situations.

There is room for improvement in the power management systems, in particular the fault detection mechanism in the MIDs.

SUMMARY OF THE INVENTION

These needs, and others, are met by a microgrid interconnect device (MID). The MID includes: a relay structured to be connected to a utility grid and distributed energy resources (DERs), the relay further structured to connect or disconnect the DERs from the grid; a relay driver connected to the relay and structured to actuate the relay to connect or disconnect the DERs, from the grid the relay driver further structured to provide relay state information including a relay driver fault feedback signal; a relay and relay driver failure identification mechanism connected to the relay driver and structured to perform a fault test to determine that the relay driver fault feedback signal is accurate; and a control circuit connected to the relay driver and the relay and relay driver failure identification mechanism, the control circuit structured to cause the relay driver to actuate the relay, receive the relay state information the relay driver, cause the relay and relay driver failure identification mechanism to perform the fault test, and determine that the relay driver fault feedback signal is accurate based on fault test results.

Another example embodiment provides a relay and relay driver failure identification mechanism for use in a microgrid interconnect device (MID). The MID has a control circuit, a relay couplable to a utility grid and distributed energy resources (DERs), a relay driver circuit structured to actuate the relay to connect or disconnect the DERs from the grid. The relay driver, the relay and the control circuit form a relay driver feedback loop. The relay and relay driver failure identification mechanism includes: a metal-oxide-semiconductor field-effect transistor (MOSFET) connected to the relay driver and the control circuit, the MOSFET structured to set a test overcurrent threshold, interrupt the relay driver feedback loop and inject a test fault to the relay driver; an overcurrent limiter connected between an I_Limit line and a drain of the MOSFET and structured to limit current flowing through the relay driver to a coil of the relay; and a pull-up resistor structured to pull output signals high based on a determination that the MOSFET is ON. The MOSFET is on by default and the diagnostic path is deactivated. The control circuit receives relay state information including a relay driver fault feedback signal from the relay driver, cause the relay and relay driver failure identification mechanism to perform the fault test and determine that the relay driver fault feedback signal is accurate based on fault test results.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
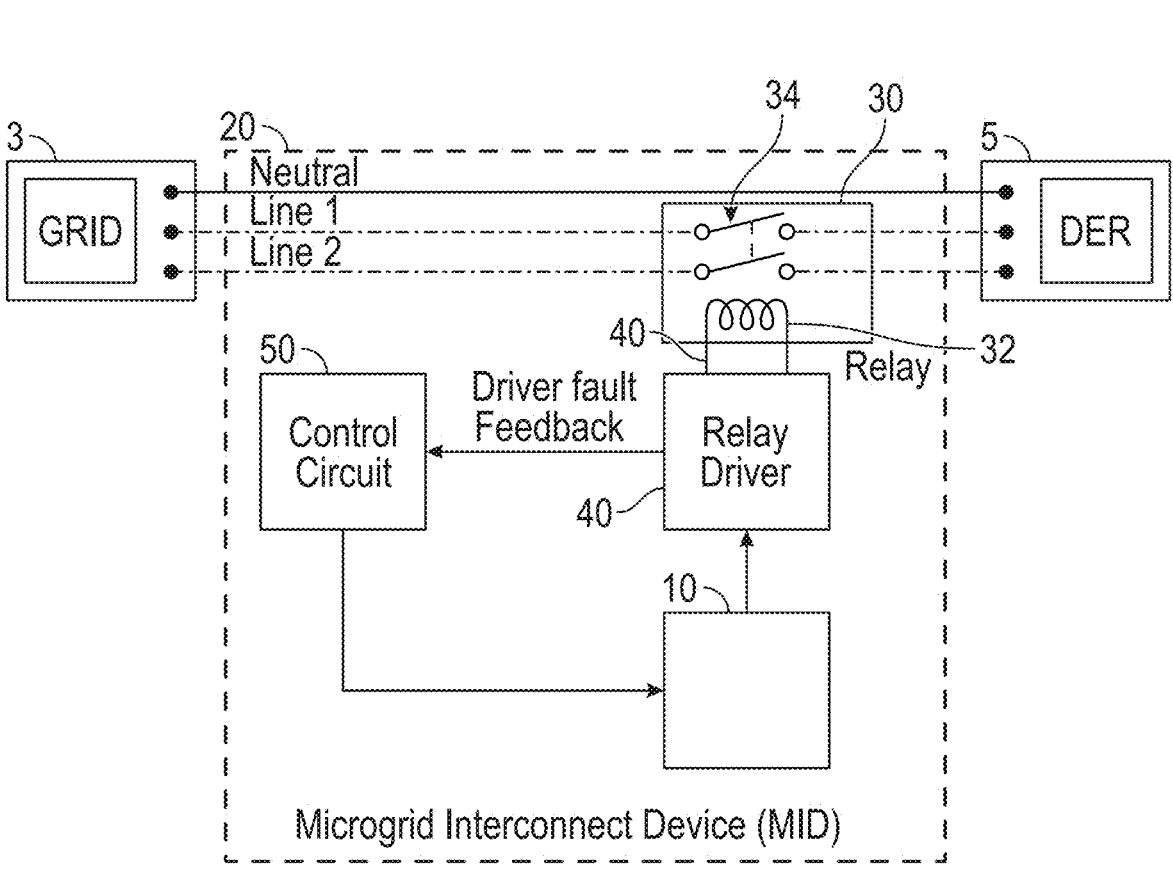
FIG. 1 illustrates a power management system including an exemplary microgrid interconnect device (MID) in accordance with a non-limiting, example embodiment of the disclosed concept.
Figure 2:
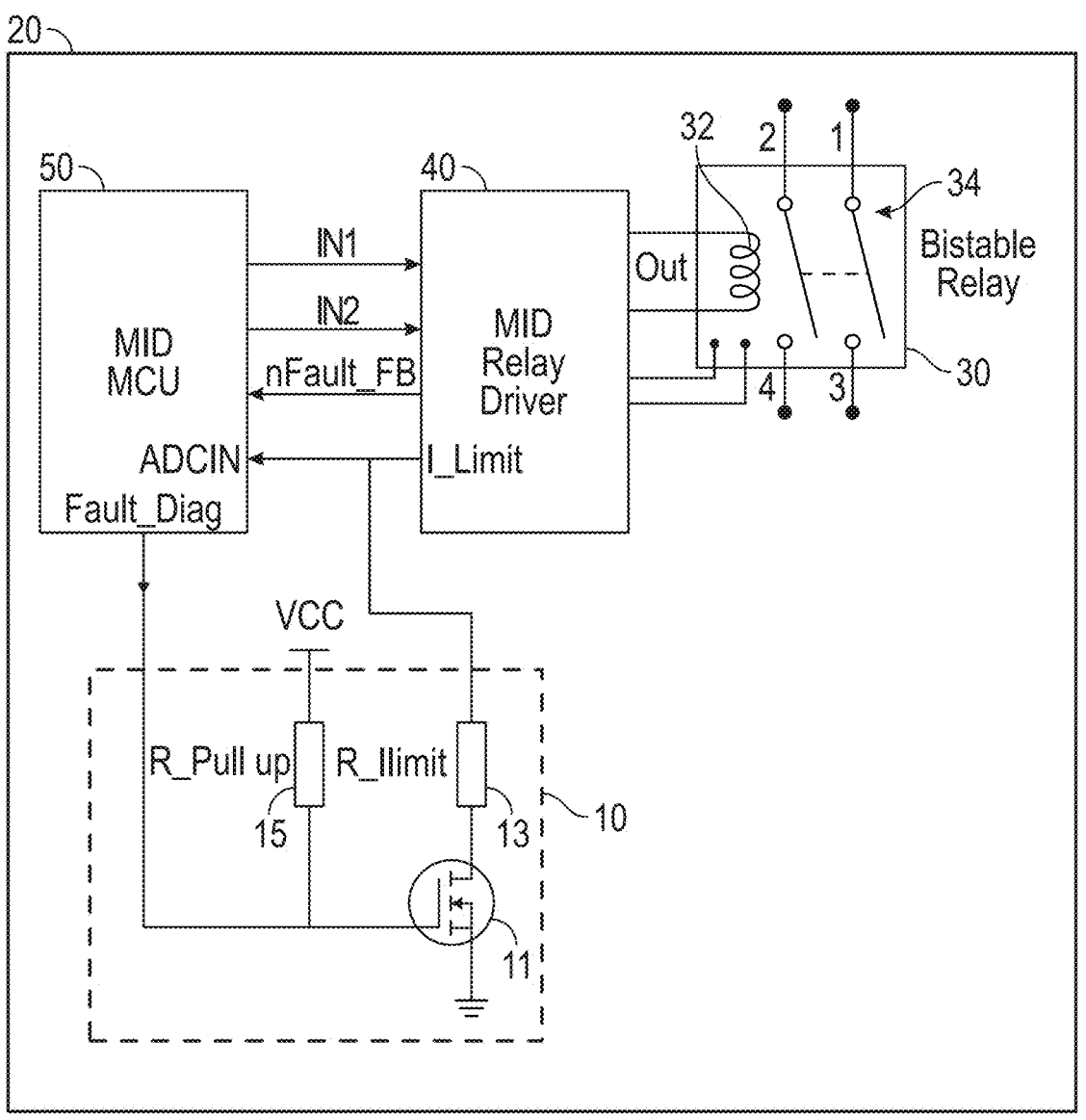
FIG. 2 illustrates the MID of FIG. 1 including an exemplary MID failure identification device in accordance with a non-limiting, example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

FIG. 1 illustrates a power management system 1 in accordance with a non-limiting, exemplary embodiment of the disclosed concept. The power management system 1 includes a primary power source (utility grid) 3, distributed energy resources (DERs) 5, and a microgrid interconnect device (MID) 20 connected to the grid 3 and the DERs 5 and structured to connect or disconnect the grid 3 and the DERs 5 for normal operation or islanding. The MID 20 includes a relay and relay driver failure identification mechanism 10, a relay 30, a relay driver 40, and a control circuit 50. The relay 30 may be, e.g., without limitation, a bistable relay and structured to be switched ON or OFF to connect or disconnect the grid 3 and the DERs 5 for normal operation or islanding. The relay 30 includes relay coil 32 and switching elements 34. The relay coil 32 is structured to actuate the switching elements 34 when the current flows through the relay coil 32. The relay driver 40 receives a command from the control circuit 50 and drives the relay 30 to connect or disconnect the DERs 5 from the grid 3. The control circuit 50 may be a processing unit that may include a processor and a memory. The processor may be, for example and without limitation, a microprocessor, a microcontroller, or some other suitable processing device or circuitry. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The control circuit 50 is structured to control the operation of the MID 20 and the components thereof. For example, the control circuit 50 receives signals from the sensors (e.g., without limitation, voltage, current and/or position sensors) and determines if the grid 3 is available and the grid's voltage and frequency are within acceptable parameters, and based on the determination, transmits commands to the relay driver 40 to actuate the relay 30 to make or break the connection between the grid 3 and the DERs 5. Further, the control circuit 50 receives the relay driver feedback information including a fault diagnostic signal 103 and a relay driver fault feedback signal 107 (as shown in FIG. 3) and causes the relay and relay driver failure identification mechanism 10 to perform a test to determine if the fault diagnostic and relay driver fault feedback signals 103 and 107 are accurate and/or identify a specific type of a relay failure based on the test results.

The relay 30, the relay driver 40 and the control circuit 50 for a relay driver feedback loop and the relay driver feedback information is fed to the control circuit 50. The relay feedback loop works as follows: the control circuit 50, based on system conditions such as grid stability, microgrid load, or operator commands, sends a command to the relay driver 40 to open or close the switching elements 34. The relay driver 40 then transmits a feedback indicative of the instantaneous relay and relay driver state. Based on feedback from the relay driver 40, the control circuit 50 validates that the command has been performed correctly. As stated previously, the relay driver fault feedback signal may not be accurate. For example, the relay 30 itself may fail to actuate correctly due to mechanical wear, electrical faults or damage. If the relay 30 does not operate as commanded, the feedback will indicate a failure. However, if the feedback mechanism itself is tied to the relay's operation (as is here), detecting the relay failure may be challenging. Due to the crucial role the relay driver fault diagnostic mechanism plays in the operation of the MID 20 and the power management system 1, it is imperative to ensure that the relay driver fault feedback is accurate. The novel relay and relay driver failure identification mechanism 10 is designed to resolve relay driver fault feedback errors and resultant system failures by proactively identifying any feedback failure by performing a pseudo fault test on the relay driver 40.

The relay and relay driver failure identification mechanism 10 includes a MOSFET (preferably, N-type MOSFET, also referred to as NMOSFET) 11, an overcurrent limit resistor 13 and a pull-up resistor 15. The MOSFET 11 is connected to the control circuit 50 and the pull-up resistor 15 at the gate and to overcurrent limit resistor 13 at the drain. The MOSFET 11 is structured to interrupt the relay driver feedback loop, and inject a test fault to the relay driver to determine that the relay driver fault mechanism is operating accurately as intended. Further, it sets a test overcurrent threshold (e.g., without limitation, 100 mA). Thus, the relay coil 32 current being below the test overcurrent threshold during the test may indicate that there is no fault. The overcurrent limit resistor 13 is connected between an I_Limit line of the relay driver 40 and the drain of the MOSFET 11 and is structured to limit the current flowing through the relay driver 40 to the relay coil 32, thereby protecting the relay coil 32. The current limiting resistor 13 may also measure the current flowing through the relay driver 40 to the relay coil 32 by measuring the voltage drop across the overcurrent limiting resistor 13. The operation of the relay and relay driver failure identification mechanism 10 is discussed further with reference to FIGS. 3-4.

Figure 3:
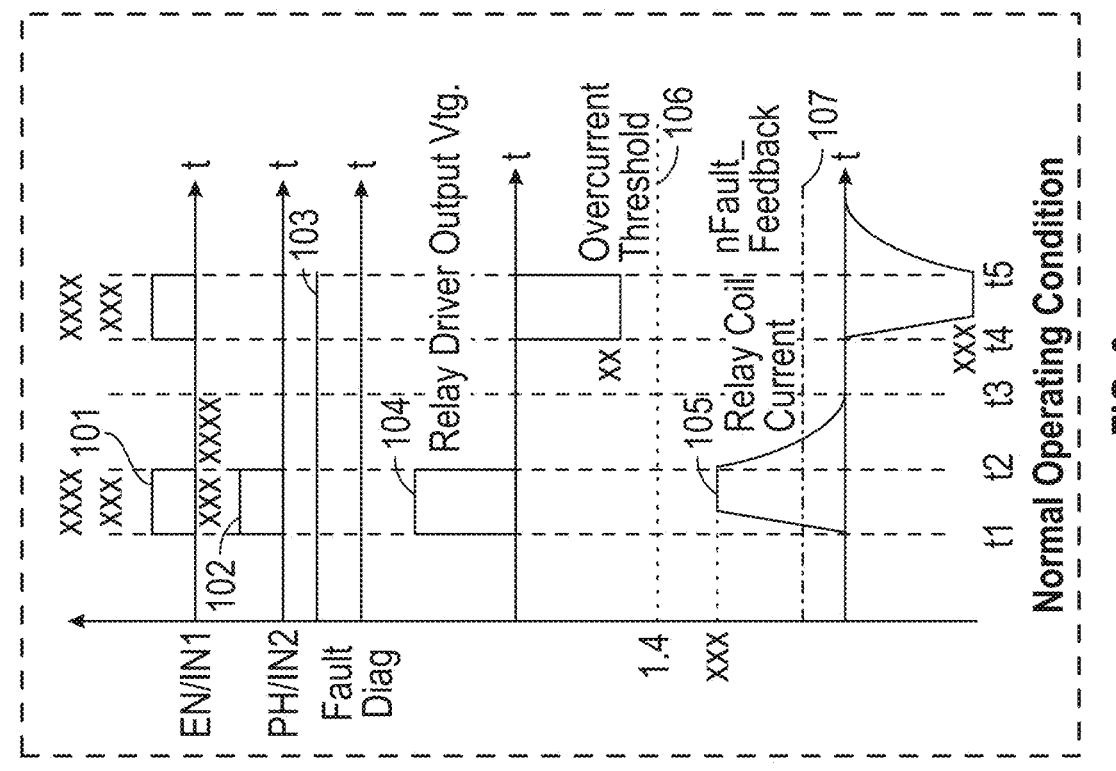
FIG. 3 illustrates signals during normal operation of the MID of FIG. 1 in accordance with a non-limiting, example embodiment of the disclosed concept.

FIG. 3 illustrates the relay state information indicating the healthy operating condition of the relay driver fault diagnostic mechanism during normal operation in accordance with a non-limiting, example embodiment of the disclosed concept. The relay state information includes input signals (EN/IN1 and PH/IN2) 101,102 to the relay 30 over a first predetermined period, e.g., without limitation, 30 ms, a fault diagnostic signal 103, a relay driver output voltage signal 104, a relay coil current signal 105, and a fault feedback signal 107. The input signals 101,102 are high for the relay closing operation and the input signal 101 is high and the input signal 102 is low for the relay opening operation. The fault diagnostic signal 103 is high when it is not activated and low when it is activated. The relay driver output voltage signal 104 is a positive pulse signal for the relay closing operation and a negative pulse signal for the relay opening operation. The relay coil current signal 105 has a positive peak for the closing operation and a negative peak for the opening operation. The relay driver fault feedback signal 107 includes a high pulse signal indicative of no detected fault and a low pulse signal indicative of detected fault.

As shown in FIG. 3, to close the switching elements 34, at time μl the control circuit 50 transmits a command to actuate the relay 30 by transmitting high pulses (logic 1) to pins EN/IN1 and PH/IN2 over the first predefined period, e.g., without limitation, 30 ms. At the same time, the relay driver 40 outputs voltage 104, e.g., without limitation, +34V and the peak current 105 flowing through the relay coil 32 reaches, e.g., without limitation, +0.8 A. The overcurrent threshold 106 for the relay coil 32 is, e.g., without limitation, 1.2 A. To open the switching elements 34, at time t4 the control circuit 50 actuates the relay 30 by transmitting high pulse 101 to pin EN/IN1 and low pulse 102 to pin PH/IN2 over the first predefined period. Simultaneously, the relay driver 40 outputs volage 104, e.g., without limitation, −34V and the relay coil 32 reaches a negative peak relay coil current 105, e.g., without limitation, −0.8 A. During these closing and opening operations of the relay 30, the peak relay coil current 105 (i.e., ±0.8 A) has remained below the overcurrent threshold 106 (i.e., 1.2 A). Therefore, the fault diagnostic has not been triggered, i.e., the fault diagnostic signal 103 remains high, and the relay driver fault feedback signal 107 also remains high, indicating that there is no fault. However, in order to validate the no fault feedback signal 107, the relay and relay driver failure identification mechanism 10 may perform a test by injecting a test or pseudo fault signal and determines whether the relay driver fault feedback signal 107 is accurate and/or if there is any fault or failure in the relay 30 and/or the relay driver 40 based on the test results as shown in FIG. 4.

Figure 4:
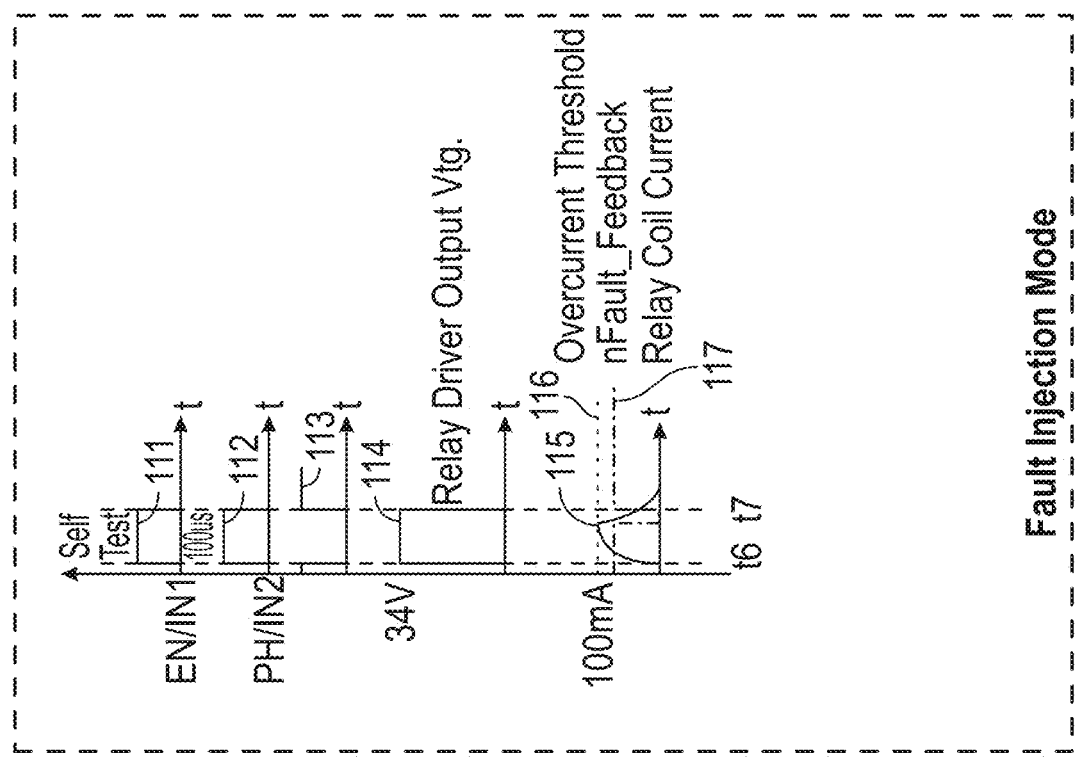
FIG. 4 illustrates signals for fault diagnostics using the exemplary MID failure identification device in accordance with a non-limiting, example embodiment of the disclosed concept.

FIG. 4 illustrates relay state information during a fault test performed by the relay and relay driver failure identification mechanism 10 in accordance with a non-limiting, example embodiment of the disclosed concept. To perform the fault test, at t6 the MOSFET 11 interrupts the relay driver feedback loop and injects a pseudo fault to the relay driver 40 by transmitting test high pulses 111,112 to pins EN/IN1 and PH/IN2 over a second predefined period (a test period starting at t6 and ending at t7). As the relay coil 32 needs at least a millisecond signal to actuate the relay 30, the pseudo fault will not cause actuation of the relay 30. In FIG. 4, the relay driver fault feedback signal 117 is low during the test period as soon as the relay coil 32 current reaches the overcurrent limit, correctly indicating that there is a fault (i.e., the pseudo fault). Further, the test fault diagnostic signal 113 is correctly activated (i.e., at low pulse), and the test relay driver output voltage 114 is at the normal output voltage at 34V. In addition, the test relay coil current 115 is the test overcurrent threshold 116, e.g., without limitation, 100 mA, indicating the presence of a fault (i.e., the pseudo fault). Thus, the signals 111-115 and 117 all successfully show that a fault has occurred, thereby validating that the fault diagnostic mechanism is correctly working and confirming that the relay driver feedback is accurate. Hence, by determining that the fault diagnostic mechanism is functioning as intended, the relay and relay driver failure identification mechanism 10 ensures the health the relay driver feedback loop.

In addition, the relay and relay driver fault identification mechanism 10 is structured to determine the specific type of relay failure based on pseudo fault test results. In the above example, the relay and relay driver failure identification mechanism 10 can determine if there is, e.g., without limitation, a relay wire physical disconnect, relay short circuit protection failure, short-circuited relay coil, relay switchover time delay, relay gate driver circuit failure and relay drive signal disconnect using the test results. For example, the relay driver feedback failure identification device 10 may determine that there is a physical disconnect in the relay coil 32 based on the fact that the relay coil current 105,115 is zero. It may determine that there is a relay short circuit protection failure based on the fact that the relay coil current 115 is the overcurrent threshold 106,116 and the fault feedback signal 117 is low. It may determine that there is short-circuited relay coil based on the fact that the relay coil current 105 touches the overcurrent threshold 106 and comes down to zero less than a predetermined amount of time. It may determine that there is a delay in switchover time based on the fact that the fault signal 117 during the test is received during or after a lapse of the second predetermined period (e.g., in between time t6 and t7, or after time t7). The delay in switchover time indicates that the relay coil 32 or the switching elements 34 may have wear and tear. It may determine that there is a relay gate driver circuit failure based on the fact that the relay coil current 115 is zero, the relay driver output voltage 114 is zero and the relay driver fault feedback signal 117 is high (indicating that there is no fault). Finally, it may determine that there is relay drive signal disconnect based on the fact that the relay coil current 115 is zero, the relay driver output voltage 115 is zero and the fault feedback signal 117 is high (indicating that there is no fault).

Accordingly, the relay and relay driver failure identification mechanism 10 not only determines whether the relay driver fault feedback signal 117 from the relay driver 40 is accurate by running a test, but also determines a type of any relay failure based on the test results. That is, it provides self-validation and self-diagnostic capabilities to the relay driver and the fault diagnostic mechanism, thereby allowing the users to address any potential equipment or system failures before they occur. By validating that the relay driver fault feedback signal is accurate, the inventive relay and relay driver failure identification mechanism 10 ensures that the MID 20 operates safely. By proactively determining that the relay driver fault feedback signal is inaccurate, the relay and relay driver failure identification mechanism 10 allows the user to perform immediate remedial actions (e.g., without limitation, shut-down of the MID 20) before any system failures occur. By determining the specific types of relay failures, the relay and relay driver failure identification mechanism 10 allows the utility personnel to perform prompt maintenance and repair before the failures become hazardous to the equipment and the system. Further, such identification of the specific types of relay failures substantially reduces time spent on inspection, maintenance and diagnostics as well as any potential downtime. Thus, the relay and relay driver failure identification mechanism 10 provides additional safety layer to the existing fault diagnostic mechanism based on the already available relay driver feedback loop and enables the MID 20 to operate in much more robust and resilient manner, as compared to the existing fault diagnostic mechanism that simply do not offer the inventive self-validation and diagnostic mechanism based on the pseudo fault test performance. Furthermore, the relay and relay driver failure identification mechanism 10 ensures that no additional safety hazards are introduced as a result of the failure of its own, the relay 30, and the relay driver 40. For example, the MOSFET 11 may be simply turned OFF if there is a possible malfunction within the relay and relay driver failure identification mechanism 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A microgrid interconnect device (MID), comprising:
a relay structured to be connected to a utility grid and distributed energy resources (DERs), the relay further structured to connect or disconnect the DERs from the grid;
a relay driver connected to the relay and structured to actuate the relay to connect or disconnect the DERs from the grid, the relay driver further structured to provide relay state information including a relay driver fault feedback signal;
a relay and relay driver failure identification mechanism connected to the relay driver and structured to perform a fault test to determine that the relay driver fault feedback signal is accurate; and
a control circuit connected to the relay driver and the relay and relay driver failure identification mechanism, the control circuit structured to cause the relay driver to actuate the relay, receive the relay state information, cause the relay and relay driver failure identification mechanism to perform the fault test and determine that the relay driver fault feedback signal is accurate based on fault test results.

2. The MID of claim 1, wherein the relay, the relay driver and the control circuit form a relay driver feedback loop and the relay state information comprises input signals to the relay driver to open or close the relay, a relay driver output voltage signal, a relay coil current signal, a fault diagnostic signal, and the relay driver fault feedback signal.

3. The MID of claim 2, wherein the relay and relay driver failure identification mechanism comprises:
a metal-oxide-semiconductor field-effect transistor (MOSFET) connected to the relay driver and structured to set a test overcurrent threshold, interrupt the relay driver feedback loop and inject a test fault to the relay driver;
an overcurrent limit resister connected between the relay driver and a drain of the MOSFET and structured to limit current flowing through relay driver to a coil of the relay; and
a pull-up resistor structured to pull a gate of the MOSFET high to keep the MOSFET high during normal operating conditions.

4. The MID of claim 3, wherein the MOSFET is an n-type MOSFET.

5. The MID of claim 3, wherein for a relay closing operation, the control circuit is structured to provide first and second input signals that are high to the relay driver during a first predetermined period, the relay driver output voltage is a positive pulse signal over the first predetermined period, and the relay coil current signal reaches a positive peak during the first predetermined period, and wherein for a relay opening operation, the control circuit is structured to provide the first input signal as high and the second input signal as low to the relay driver during the first predetermined period, the relay driver output voltage is a negative pulse signal over the first predetermined period, and the relay coil current signal reaches a negative peak during the first predetermined period.

6. The MID of claim 5, wherein during normal operation the fault diagnostic signal is a high pulse signal indicating that relay driver fault diagnostic mechanism is not activated, and the relay driver fault feedback signal is a high pulse signal indicative of no detected fault, and wherein upon detection of a fault the fault diagnostic signal is a low pulse signal indicating that the relay driver fault diagnostic mechanism is activated, and the relay driver fault feedback signal is a low pulse signal indicative of a detected fault.

7. The MID of claim 5, wherein the relay coil current signal having a peak equal to or higher than the test overcurrent threshold indicates that a fault has occurred.

8. The MID of claim 6, wherein the relay and relay driver failure identification mechanism performs the fault test by injecting a pseudo fault signal to the relay driver for a second predetermined period.

9. The MID of claim 8, wherein the relay and relay driver failure identification mechanism determines that the relay driver fault feedback signal is accurate based on the relay driver fault feedback signal being a low pulse signal during the second predetermined period, the low pulse signal indicative of the detected test fault.

10. The MID of claim 8, wherein the relay and relay driver failure identification mechanism is structured to determine a type of relay failure based on the test results.

11. The MID of claim 10, wherein the relay and relay driver failure identification mechanism determines that relay coils have a physical disconnect based on a determination that the relay coil current is zero.

12. The MID of claim 10, wherein the relay and relay driver failure identification mechanism determines that a relay short circuit protection failure has occurred based on a determination that the relay coil current touches the test overcurrent threshold and comes down to zero within a predetermined amount of time.

13. The MID of claim 10, wherein the relay and relay driver failure identification mechanism determines that switchover time is delayed based on a determination that the relay driver fault feedback signal during the fault test is received after the lapse of the second predetermined period.

14. The MID of claim 10, wherein the relay and relay driver failure identification mechanism determines that a relay gate driver circuit failure and/or a relay driver signal disconnect has occurred based on a determination that the relay coil current is zero, the relay driver output voltage is zero and the fault feedback signal is high.

15. A relay and relay driver failure identification mechanism for use in a microgrid interconnect device (MID) having a control circuit, a relay couplable to a utility grid and distributed energy resources (DERs), a relay driver circuit structured to actuate the relay to connect or disconnect the DERs from the grid, the relay driver, the relay and the control circuit forming a relay driver feedback loop, the relay and relay driver failure identification mechanism comprising:
a metal-oxide-semiconductor field-effect transistor (MOSFET) connected to the relay driver and the control circuit, the MOSFET structured to set a test overcurrent threshold, interrupt the relay driver feedback loop and inject a test fault to the relay driver;
an overcurrent limit resister connected between the relay driver and a drain of the MOSFET and structured to limit current flowing through relay driver to a coil of the relay; and a pull-up resistor structured to pull a gate of the MOSFET high to keep the MOSFET high during normal operating conditions, wherein the control circuit receives relay state information including a relay driver fault feedback signal from the relay driver, cause the relay and relay driver failure identification mechanism to perform the fault test and determine that the relay driver fault feedback signal is accurate based on fault test results.

16. The relay and relay driver failure identification mechanism of claim 15, wherein the relay and relay driver failure identification mechanism determines that the relay driver fault feedback signal is accurate based on the relay driver fault feedback signal indicating the detected test fault.

17. The relay and relay driver failure identification mechanism of claim 15, wherein the relay and relay driver failure identification mechanism determines that relay coils have a physical disconnect based on a determination that relay coil current is zero.

18. The relay and relay driver failure identification mechanism of claim 15, wherein the relay and relay driver failure identification mechanism determines that a relay short circuit protection failure has occurred based on a determination that the relay coil current touches the test overcurrent threshold and comes down to zero within a predetermined amount of time.

19. The relay and relay driver failure identification mechanism of claim 15, wherein the relay and relay driver failure identification mechanism determines that switchover time is delayed based on a determination that the relay driver fault feedback signal during the fault test is received after the lapse of the second predetermined period.

20. The relay and relay driver failure identification mechanism of claim 15, wherein the relay and relay driver failure identification mechanism determines that a relay gate driver circuit failure and/or a relay driver signal disconnect has occurred based on a determination that the relay coil current is zero, the relay driver output voltage is zero and the fault feedback signal is high.

* * * * *